United States Patent [19]
Kim et al.

[11] Patent Number: 5,929,910
[45] Date of Patent: Jul. 27, 1999

[54] VIDEO OVERHEAD DISPLAY SYSTEM

[75] Inventors: Jun-ho Kim; Seung-yeob Lee; Myung-ho Yoo, all of Kyunggi-do, Rep. of Korea

[73] Assignee: Samsung Aerospace Industries, Ltd., Kyeongsangnam-do, Rep. of Korea

[21] Appl. No.: 08/804,192

[22] Filed: Feb. 21, 1997

[30] Foreign Application Priority Data

| Feb. 21, 1996 | [KR] | Rep. of Korea | 96-2611 |
| Feb. 27, 1996 | [KR] | Rep. of Korea | 96-3195 |
| Apr. 8, 1996 | [KR] | Rep. of Korea | 96-10419 |

[51] Int. Cl.$^6$ ................................. H04N 5/225
[52] U.S. Cl. ................ 348/373; 348/222; 348/739
[58] Field of Search ............... 348/739, 744, 348/777, 207, 222, 240, 704, 77, 79, 80, 143, 373; 250/210.2; 355/64, 21; H04N 9/31, 5/225

[56] References Cited

U.S. PATENT DOCUMENTS

| 4,125,828 | 11/1978 | Resnick et al. | 250/461 R |
| 4,680,635 | 7/1987 | Khurana | 348/79 |
| 4,727,411 | 2/1988 | Yamaguchi et al. | 348/571 |
| 4,884,881 | 12/1989 | Lichtman et al. | 350/507 |
| 4,939,580 | 7/1990 | Ishikawa et al. | 348/373 |
| 4,963,986 | 10/1990 | Fukuyama et al. | 348/373 |
| 5,185,667 | 2/1993 | Zimmermann | 348/207 |
| 5,247,330 | 9/1993 | Ohyama et al. | 355/64 |
| 5,301,220 | 4/1994 | Wong | 348/162 |
| 5,406,323 | 4/1995 | Tanigaki et al. | 348/15 |
| 5,557,328 | 9/1996 | Ishihama et al. | 348/358 |
| 5,621,532 | 4/1997 | Ooki et al. | 356/444 |
| 5,650,819 | 7/1997 | Sato et al. | 348/240 |
| 5,684,530 | 11/1997 | White | 348/131 |

*Primary Examiner*—Michael H. Lee
*Attorney, Agent, or Firm*—Finnegan, Henderson, Farabow, Garrett & Dunner, L.L.P.

[57] ABSTRACT

A video overhead display system for displaying an image of an object includes an image enlarging unit for magnifying an optical image of the object. An image pick-up unit receives the magnified optical image of the object and converts the magnified optical image into an electronic image signal. An image output unit receives the electronic image signal and converts the electronic image signal into a displayed image.

24 Claims, 12 Drawing Sheets

VIDEO OVERHEAD DISPLAY SYSTEM

BACKGROUND OF THE INVENTION

1. Field of the Invention

The present invention relates to a video overhead display system. More particularly, the present invention relates to a video overhead display system which can accurately position an object and reverse and magnify an image of the object.

2. Description of the Prior Art

A video overhead display system generally includes a table for holding an object, an image pick-up device for converting an optical image of an object into an electronic image signal, and support means for supporting the image pick-up device. Further, the image pick-up device is usually provided with a zoom lens unit which enlarges the optical image, according to a fixed magnification (typically eight times). A video output device receives the image data from the image pick-up device and displays the video image of the object.

The video output device typically comprises either a video display unit or both a video display unit and a video processor. The video display unit converts the image data received from the image pick-up device and displays the video image. The display unit may, for example comprise a cathode-ray tube, a liquid crystal display, or a flat panel display. If a video processor is included in the output device, the processor stores and re-processes the image data received from the image pick-up device before outputting the image data to the video display unit.

FIG. 14 illustrates a prior art video overhead display system. Referring to FIG. 14, the prior art video display system includes a body 2, an object plate 3, a main pole rotating portion 4, a light box 5, a main pole 6, a head rotating portion 7, a camera head 8, and lamp units 9. An object, such as a film image, is placed on object plate 3, which comprises part of body 2. Main pole 6 comprises two parts which cooperate to allow its length to be adjusted. Main pole 6 connects to main pole rotating portion 4, which, in turn, connects to a middle, raised portion of body 2. Main pole rotating portion 4 allows main pole 6 to be rotated to predetermined angles. Head rotating portion 7 connects at one end to an upper portion of main pole 6, while its other end connects to camera head 8. Camera head 8 picks-up the optical image of the object and is connected to portion 7 such that it can rotate in the vertical plane. Camera head 8 may also include an adapter lens 8a. Lamp units 9 are connected to body 2 at the left and right sides of main pole rotating portion 4.

In the prior art video overhead display system described above, the position of camera head 8 is controlled by adjusting the rotation of main pole rotating portion 4, the length of main pole 6, and the vertical rotation of camera head 8 on head rotating portion 7. Through this adjustment process, the image pick-up device mounted in camera head 8 can capture the optical image of the object.

The system may also includes light box 5, which is optionally placed on top of object plate 3. Light box 5 is used when a transparent object is being viewed by the display system. Further, a control panel 2a is provided on the front of object plate 3 for controlling the image pick-up and lighting functions.

The operation of the above prior art video display system will now be described. An object is placed on object plate 3, and a user selects a magnification value (e.g., 8 times) using control panel 2a. The lens system of camera head 8 focuses and magnifies the image, according to the selected magnification value. As a result, an optical image of the object is formed on the image pick-up device disposed in camera head 8. The image pick-up device converts the optical image into an electronic image signal and outputs image data to a video output device (not shown).

Generally, the image pick-up device comprises a charge coupled device (CCD). The CCD is comprised of a plurality of pixels, and the optical image which forms on each pixel is converted into an electronic image signal. Each electronic image signal is then output in a regular sequence.

When the object is cellular tissue or a microorganism, the display system highly magnifies the optical image using a separate image microscope and lamps. The image microscope generally includes an object lens, which has three predetermined magnifications that may be selected by a user. The optical image that passes through the obiect lens is inverted turned (turned upside-down), and the inverted image is then transmitted to the image pick-up device through an eye lens.

Depending on the object to be displayed (i.e., film documents, etc.), suitable optical lenses are mounted to adapter lens 8a. However, the above video overhead display system has the drawback in that a separate image microscope and lighting device is required whenever the user wants to view a highly magnified image. In addition, if the image microscope is used, then the image may only be magnified using one of the predetermined magnifications of the object lens (typically 3 magnification values). Thus, control of the image magnification is limited, making it difficult to attain the exact degree of magnification desired by a user.

Furthermore, since the prior art video overhead display system does not have an image reversing function, the system is often difficult to use. Namely, when the image microscope is used, it is difficult to adjust the image pickup location and to view the object since its image is inverted.

Finally, since the image pick-up position is adjusted using main pole 6, main pole rotating portion 4, and camera head 8, the image pickup angle is greatly limited. Thus, if the shape of the object is complicated, then it must be continuously re-positioned in order for its image to be picked-up by the pick-up device. As a result, image pick-up of the object becomes difficult.

SUMMARY

An important advantage of the present invention is the provision of an arrangement which substantially obviates one or more of the limitations and disadvantages of the described prior art methods. In particular, the present invention is directed to an overhead video display system which can magnify and reverse an image of an object, and which allows an image pick-up unit to be rotated to various vertical and horizontal angles.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a video overhead display system for displaying an image of an object. The system comprises image enlarging means for magnifying an optical image of the object. Image pick-up means receives the magnified optical image of the object and converts the magnified optical image into an electronic image signal. Image output means receives the electronic image signal and converts the electronic image signal into a displayed image.

In another aspect, the invention includes a video overhead display system for displaying an image of an object, comprising a body having a control panel. An image enlarger magnifies an optical image of the object. An image pick-up unit, connected to the body, picks up the magnified optical image of the object. Further, the image enlarger is separably mounted to the image pick-up unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate an embodiment of the invention, and, together with the description, serve to explain the principles of the invention. In the drawings.

DETAILED DESCRIPTION

Preferred embodiments of the present invention will now be described in detail with reference to the accompanying drawings.

Figure 1:
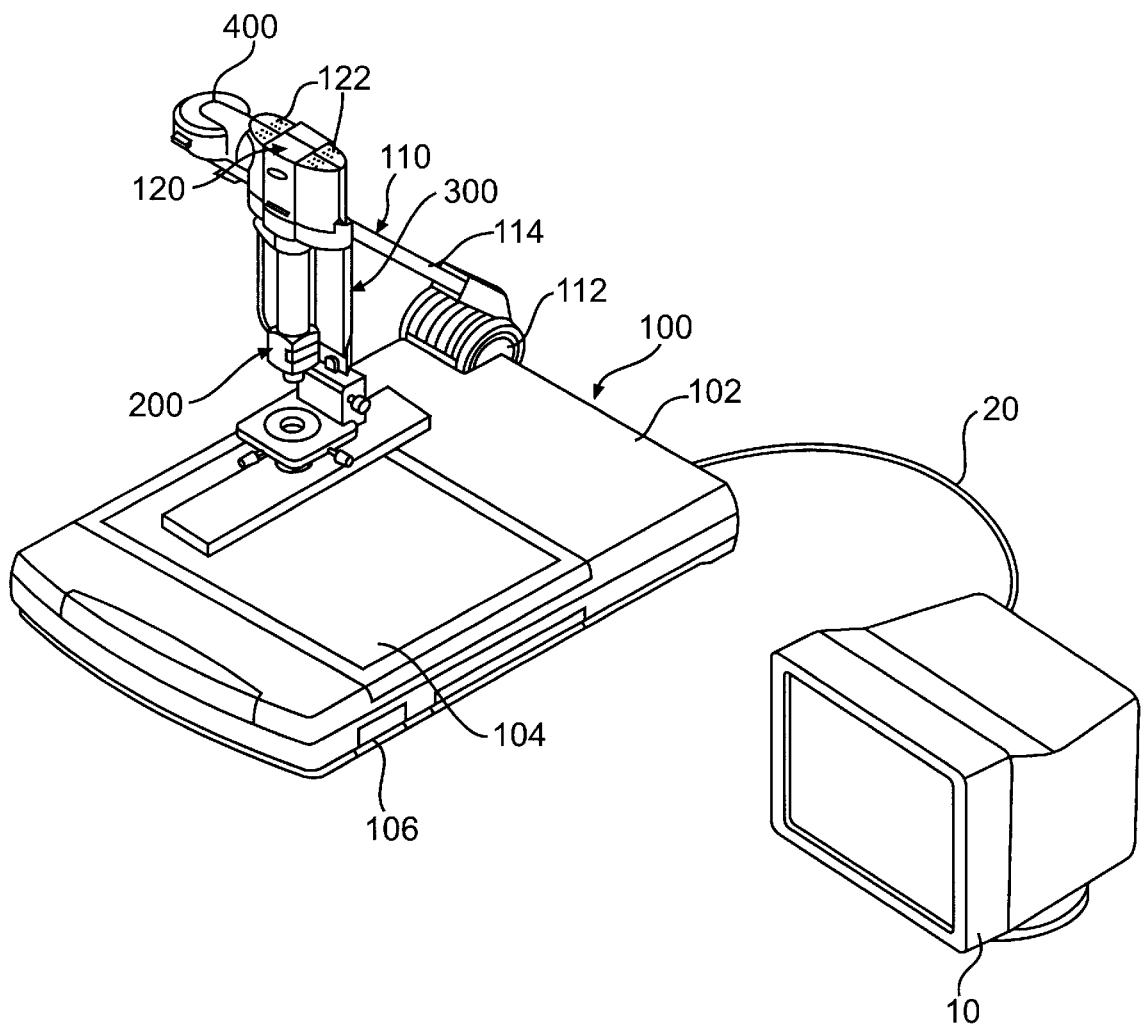
FIG. 1 is a perspective view of a video overhead display system, according to a preferred embodiment of the present invention.

FIG. 1 is a perspective view of a video overhead display system, according to a preferred embodiment of the present invention. Referring to FIG. 1, the video overhead display system includes a body 100, an object table 102, a light box 104, a control panel 106, a support 110, an angle rotation device 112, a vertical moving device 114, an image pick-up unit 120, a lighting device 122, a video image enlarger 200, an object moving device 300, and a rotating device 400. The video overhead display system further includes a display device 10 and an image signal transmitting line 20.

Image pick-up unit 120 picks-up an optical image of an object placed on object table 102, and converts the optical image into an outputted electronic image signal. Support 110 connects to body 100 and supports image pick-up unit 120. Video enlarger 200 enlarges an optical image of the object, according to a set magnification, and transmits the magnified image to image pick-up unit 120.

Display device 10 receives the image signal output from image pick-up unit 120, and converts the image signal into a displayed image. Image signal transmitting line 20 is provided for connecting image pick-up unit 120 to display device 10. Although display device 10 preferably comprises a cathode-ray tube, other types of image display devices may be used (i.e., a liquid crystal display, a flat panel display, a video image processor, a computer, etc.). Image pick-up unit 120 further includes an image pick-up device and a zoom lens unit (each not shown) and lighting device 122 for illuminating the object. The zoom lens unit is connected to the front of the image pick-up device and enlarges the image of the object. An adapter lens (not shown) is interchangeably connected to the front of the zoom lens unit, such that different optical lenses may be used.

Body 100 includes light box 104 separably mounted to object table 102, and control panel 106 which allows a user to control the video overhead display system. Also provided is an image reversing device, described below, on body 100. Support 110 includes angle rotation device 112 formed on body 100 and connected to a bottom part of vertical moving device 114, which has two parts to allow for control of its length. Rotating device 400 is fixed on an upper part of vertical moving device 114, such that it can rotate horizontally and allow for image pick-up unit 120 to rotate vertically.

Figure 2:
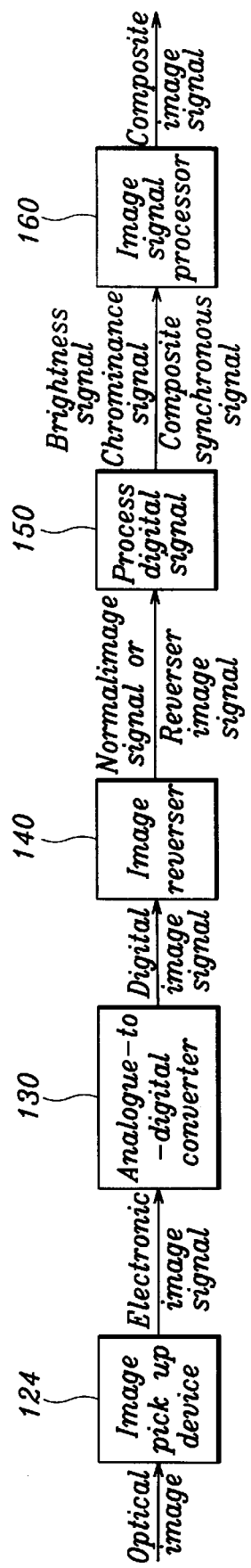
FIG. 2 is a block diagram of an image reversing device according to a preferred embodiment of the present invention.

FIG. 2 is a block diagram of the image reversing device, according to a preferred embodiment of the present invention. Referring to FIG. 2. the image reversing device comprises an image pick-up device 124, an A/D converter 130, an image reverser 140, a digital signal processor 150, and an image signal processor 160.

A/D converter 130 receives an electronic image signal output from image pick-up device 124 of image pick-up unit 120 and converts it into a digital image signal. Image reverser 140 receives the digital image signal, and, according to a mode selected by the user at control panel 106, performs processing on the image data. Specifically, if a reverse mode is selected, then image reverser 140 reverses the image data. If the reverse mode is not selected, then image reverser 140 does not perform any processing on the image data. Either way, digital signal processor 150 receives the digital image signal output from image reverser 140, and processes it into three signals: a luminance signal, a chrominance signal, and a composite synchronizing signal. Each of these signals are output to image signal processor 160, which combines the three signals so as to form a composite image signal.

Figure 3:
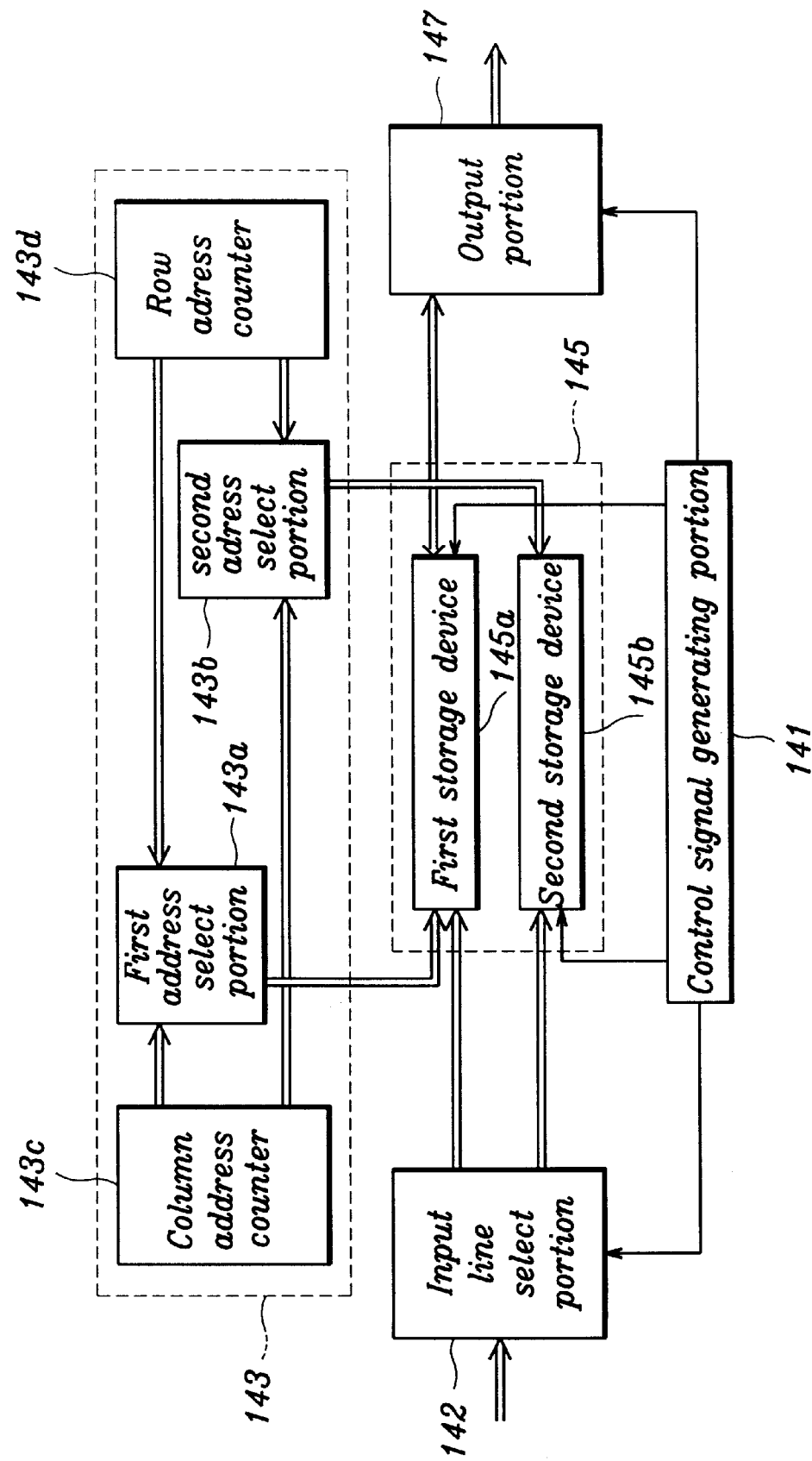
FIG. 3 is a block diagram of an image reverser 140 shown in FIG. 2.

FIG. 3 is a block diagram of image reverser 140 shown in FIG. 2. Referring to FIG. 3, image reverser 140 comprises a control signal generator 141, an input line selector 142, an address selector 143, a memory 145, and an output unit 147.

Control signal generator 141 outputs control signals for performing write and read operations on the digital image data received from A/D converter 130, according to output instructions entered by the user at control panel 106. Further, control signal generator 141 outputs control signals for controlling each of the other elements of image reverser 140.

According to the control signals outputted by control signal generator 141, input line selector 142 selects input lines along which the digital image data is transferred. Address selector 143 either outputs an address at which the digital image data is written or selects an address from which image data is read, according to a received control signal. Accordingly and in response to control signals from control signal generator 141, memory 145 writes or reads the digital image data according to the address output from address selector 143. Output portion 147 outputs the digital image data from memory 145 to digital signal processor 150.

Memory 145 further comprises a first memory 145a and a second memory 145b. In addition, address selector 143 further comprises a first address selector 143a corresponding to first memory 145a, and a second address selector 143b corresponding to second memory 145b. Address selector 143 also includes a column address counter 143c and a row address counter 143d. Column address counter 143c counts the number of column addresses, according to a control signal received from generator 141. Counter 143c outputs the count value to both first address selector 143a and second address selector 143b. Row address counter 143d counts the number of row addresses, according to a received control signal, and outputs the count value to first and second address selectors 143a and 143b.

Figure 4:
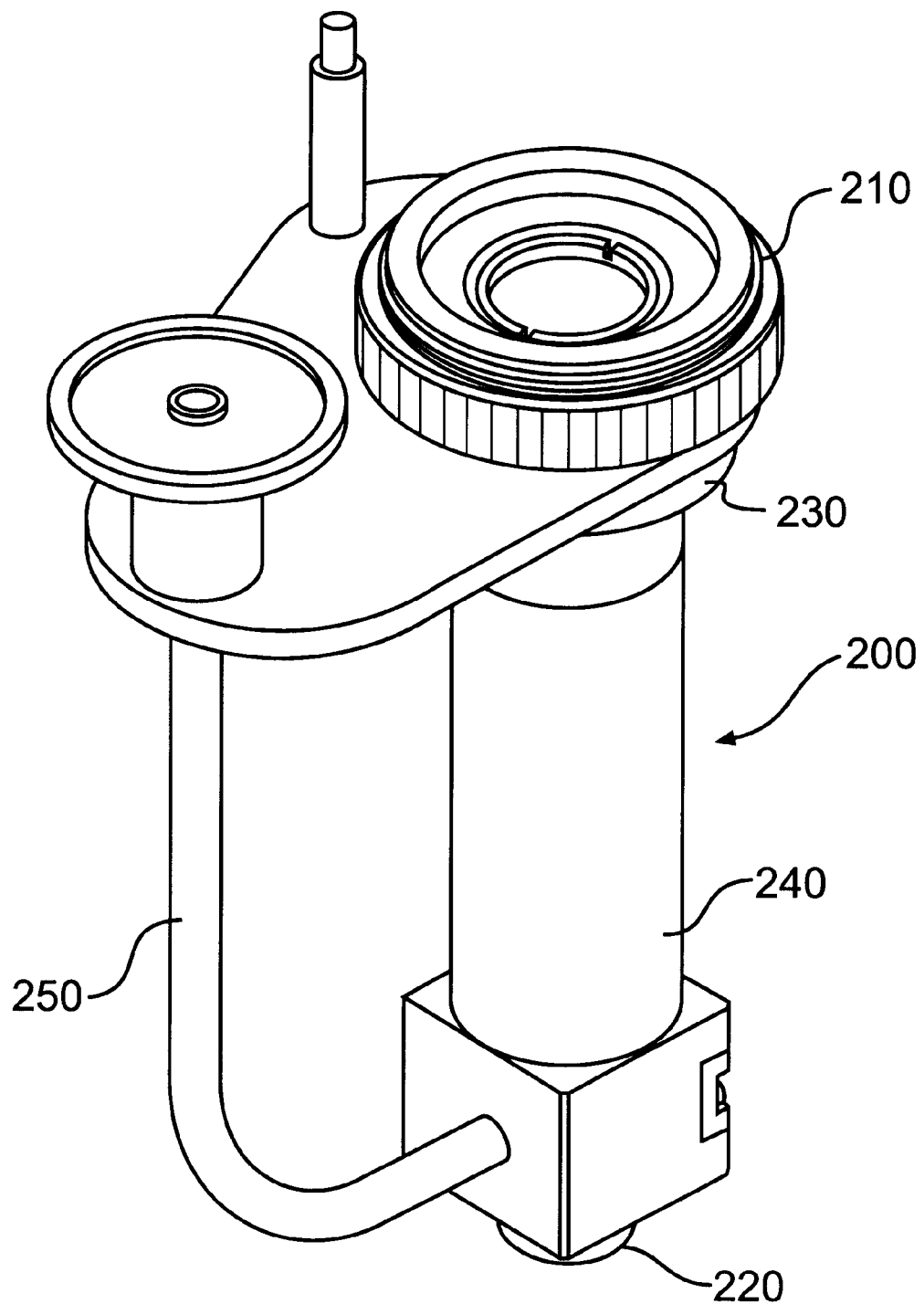
FIG. 4 is a perspective view of an image enlarger 200 shown in FIG. 1.
Figure 5:
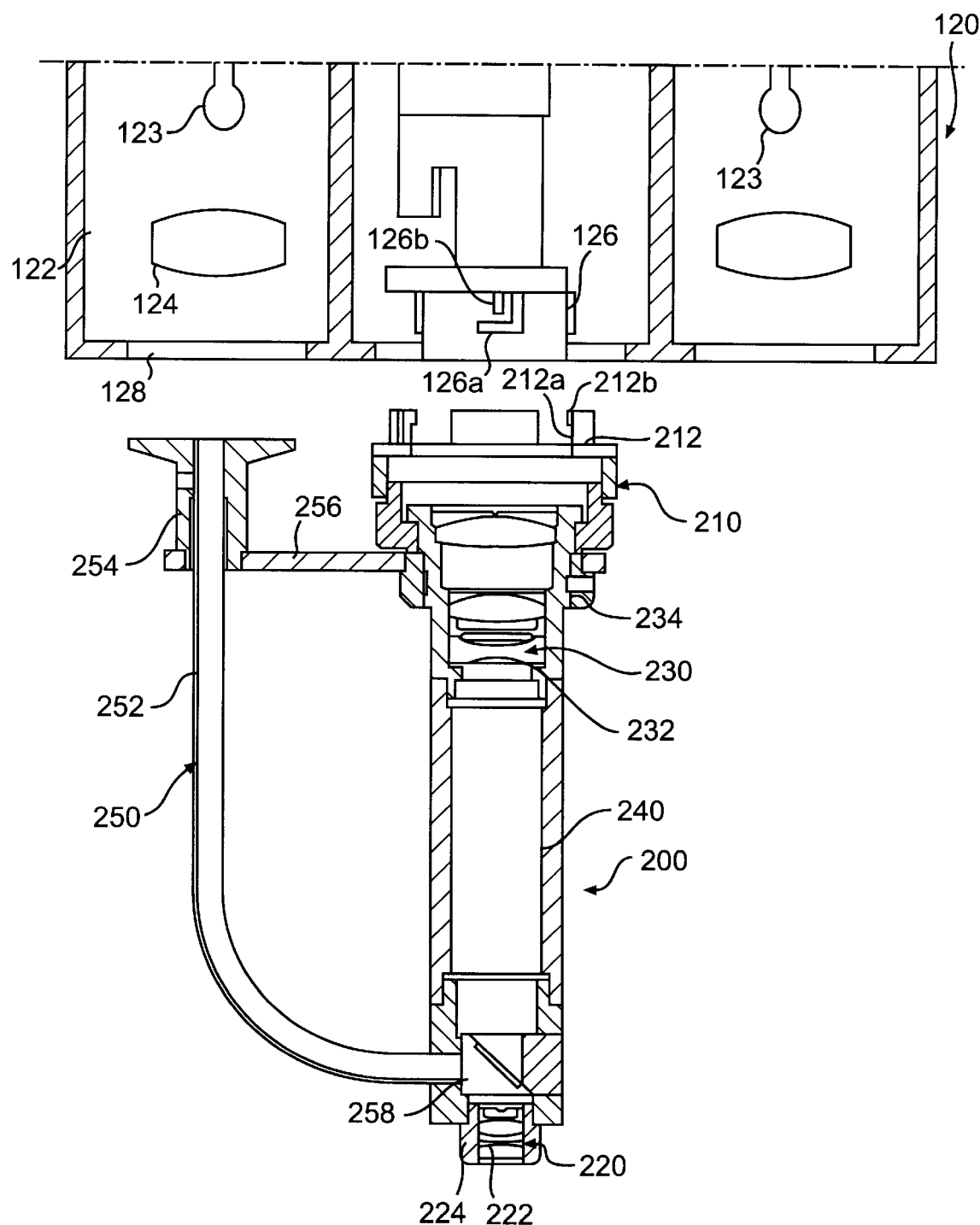
FIG. 5 is a partial sectional view of image enlarger 200 mounted to an image pickup portion.

FIGS. 4 and 5 are a perspective view and a partial sectional view, respectively, of image enlarger 200 shown in FIG. 1. Referring to FIG. 4, image enlarger 200 comprises a connecting unit 210, an object lens unit 220, an eyepiece lens unit 230, a lens barrel 240, and a light guide 250. Connecting unit 210 connects image enlarger 200 to image pick-up unit 120. Object lens unit 220, which is placed close to the object, enlarges the object to a high magnification. Lens barrel 240 connects object lens unit 220 to eyepiece lens unit 230, such that lens units 220 and 230 are located a fixed predetermined distance apart from each other.

As shown in FIG. 5, connecting unit 210 connects image enlarger 200 to an adapter lens unit 126 of image pick-up unit 120. To accomplish this, connecting unit 210 includes a protrusion which is received into a groove formed in adapter lens unit 126. Specifically, adapter lens unit 126 includes a guide projection 126a and a connecting groove 126b. Guide projection 126a is formed on an outside circumference of adapter lens unit 126 and has a reverse 'L' shape. Connecting groove 126b is formed next to and parallel to the vertical part of guide projection 126a.

Image enlarger 200 further includes a coupling unit 212 positioned on an upper part of connecting unit 210. Coupling unit 212 includes a guide groove 212a and a hook 212b, which protrudes outward above guide groove 212a. Guide groove 212a is formed on an inside part of coupling unit 212 such that guide projection 126a is received therein. Thus, when the horizontal part of guide projection 126a is slid into guide groove 212a, hook 212b is inserted into connecting groove 126b. As a result, hook 212b is elastically coupled with connecting groove 126b. In the above, it is preferable that there are three sets of guide projections 126a and connecting grooves 126b and guide grooves 212a and hooks 212b, positioned at predetermined distances around the circumference of adapter lens unit 126 and coupling unit 212, respectively.

Object lens unit 220 of image enlarger 200 is formed using a plurality of different lenses 222 (i.e., a convex lens, a concave lens, etc.) mounted within an eyepiece lens barrel 224. Also, object lens unit 220 is detachably connected to lens barrel 240 and has a plurality of fixed magnifications, such as 3×, 6×, and 9× magnification settings. For detachability of objective lens unit 220, both object lens 220 and lens barrel 240 are provided with mating threads on their outer and inner circumferences, respectively. In this way, a user is able to change magnifications by switching to a different object lens units 220.

Eyepiece lens unit 230 comprises a plurality of lenses 232 (i.e., a convex lens, a concave lens, etc.). Further, to maintain a working amount of distance between object lens unit 220 and an object being viewed, eyepiece lens unit 230 comprises a first bi-convex lens having a positive refractive index, a second bi-convex lens having a positive refractive index, and a third bi-concave lens having a negative refractive index. Furthermore, eyepiece lens unit 230 is defined by the following equations:

$$0.48 < D/f < 0.51, \text{ and} \qquad (1)$$

$$0.37 < fb/f < 0.4, \qquad (2)$$

where:

D is the total length of eyepiece lens unit 230, f is the focal point length of eyepiece lens unit 230, and fb is the back focal point length of evepiece lens unit 230.

With eyepiece lens unit 230 and object lens unit 220 positioned in lens barrel 240 as described above, an image of the object passes first through object lens unit 220. Object lens unit 220 magnifies the optical image by an initial magnification and transfers it to image pick-up unit 120 through eyepiece lens unit 230. By maintaining a predetermined object image distance between eyepiece lens unit 230 and image pick-up unit 120, an image of the object can be realized when an image point of object lens unit 220 is aligned with an object image of eyepiece lens unit 230.

Furthermore, since object lens unit 220 and eyepiece lens unit 230 both magnify the image, a sufficient working distance can be ensured between the object lens unit 220 and the object. Thus, the total magnification of the object is equal to the magnification of object lens unit 220 multiplied by the magnification of eyepiece lens unit 230. Therefore, the amount of magnification required of object lens unit 220 is reduced since part of the magnification is performed by eyepiece lens unit 230. This two-step magnification approach ensures an adequate degree of distance between the object and object lens unit 220. Lastly, the detachability of object lens unit 220 allows for the magnification to be easily adjusted by the user.

Image enlarger 200 further comprises light guide 250 for illuminating object lens unit 220. Light guide 250 transmits light from lighting device 122, mounted in image pick-up unit 120, to object lens unit 220. Light guide 250 further comprises a light transmitting unit 252, a light connecting unit 254, a connecting plate 256 and a prism 258. Light transmitting unit 252 transmits light from lighting device 122 to object lens 220. Connecting unit 254 connects light guide 250 to lighting, device 1 Connecting plate 256 supports light connecting unit 254 by attaching it to connecting unit 210 of image enlarger 200, at a predetermined distance therebetween. Finally, light guide 250 includes prism 258 fixed above object lens unit 220 and at the end of light transmitting unit 252. Prism 258 irradiates the transmitted light on object lens unit 220.

Lighting device 122 comprises a light source 123, a condenser lens 124 and an opening 128. Light source 123 emits light and condenser lens 124 focuses the emitted light through opening 125 into light transmitting unit 252 of light guide 250. Further, light transmitting unit 252 preferably comprises optical fibers.

Figure 6:
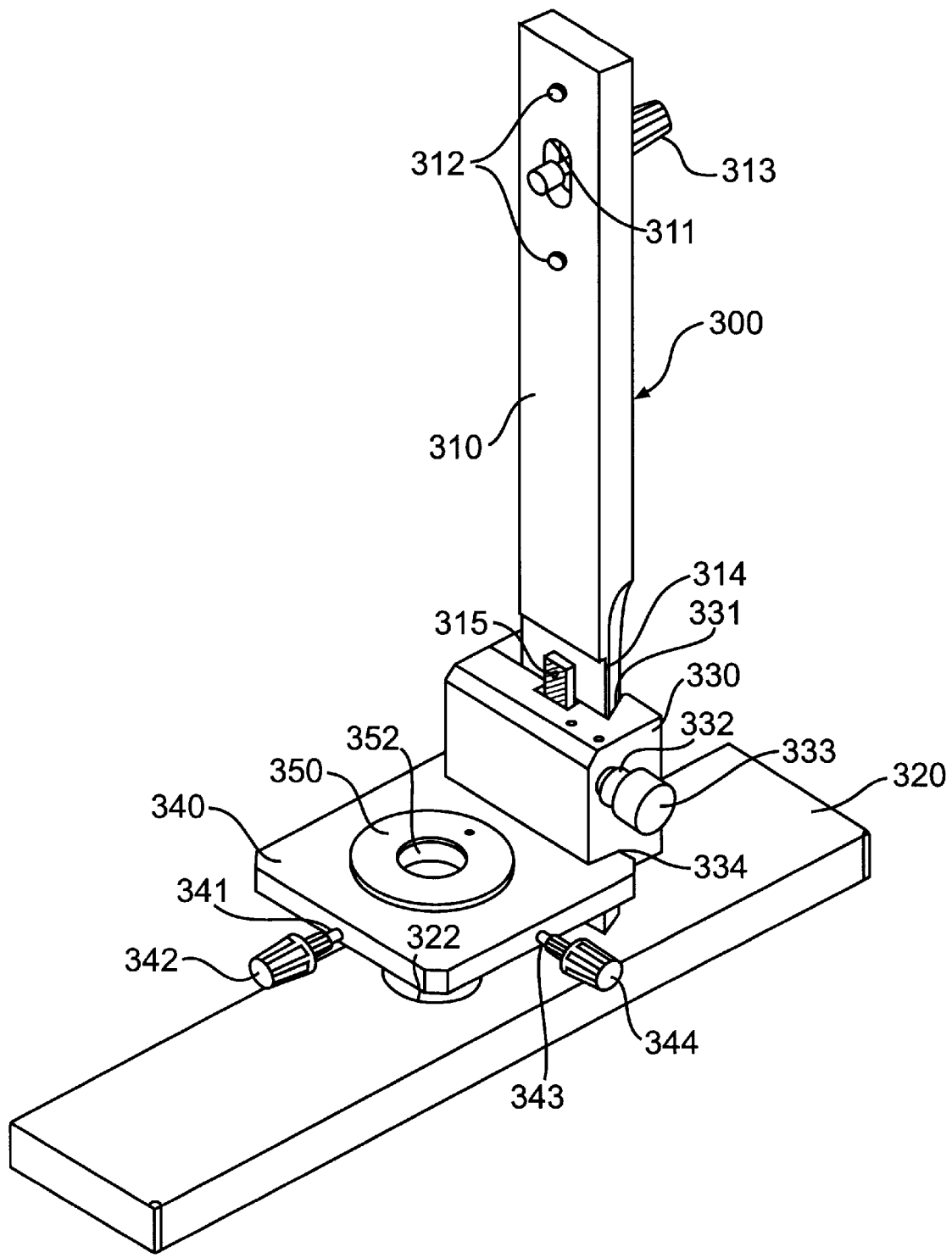
FIG. 6 is a perspective view of an object moving device 300 shown in FIG. 1.
Figure 7:
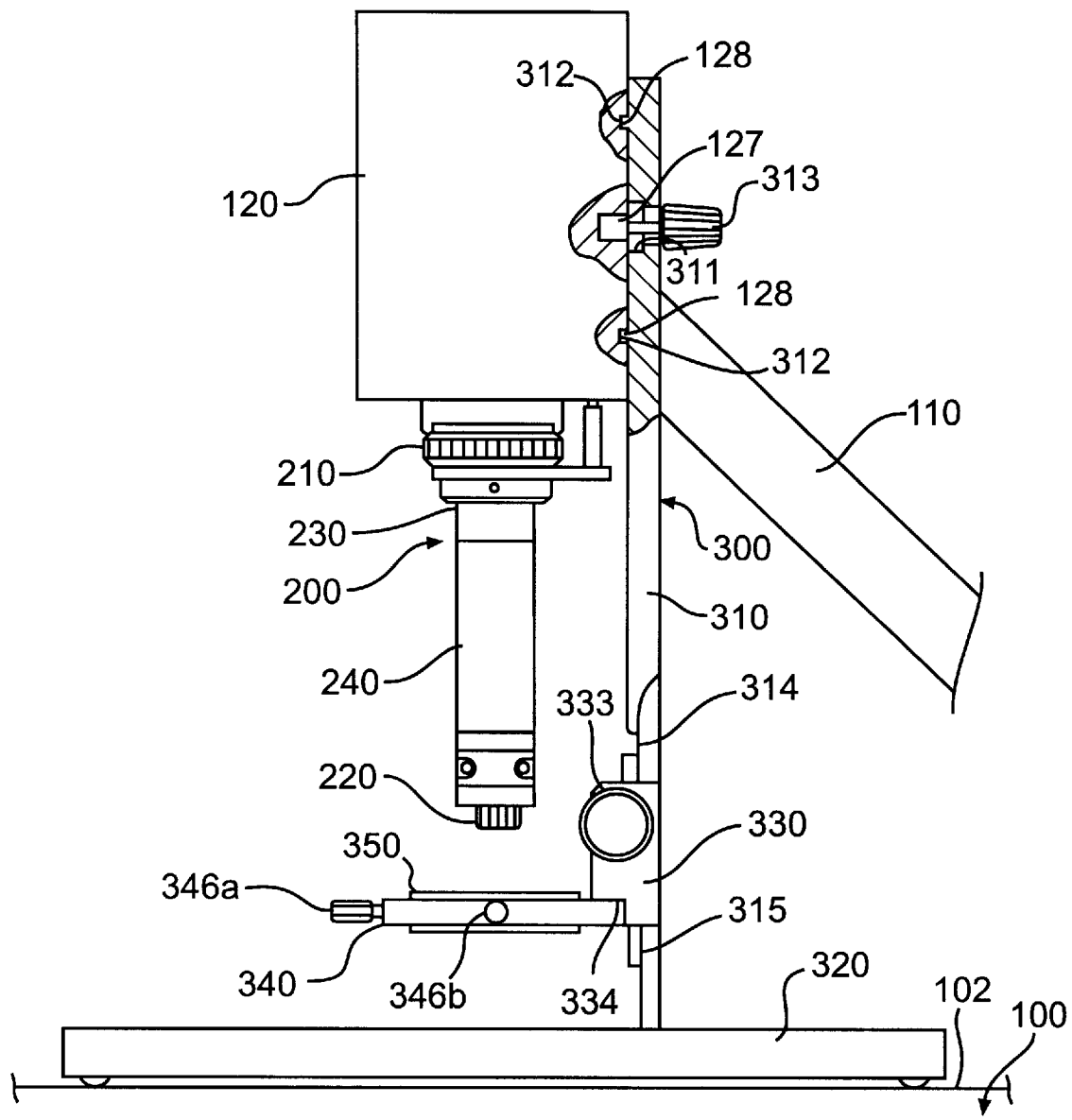
FIG. 7 is a partial sectional view of object moving device 300 mounted to the image pickup portion.

FIGS. 6 and 7 are a perspective view and partial sectional view, respectively, of object moving device 300 shown in FIG. 1. Referring to FIG. 6, object moving device 300 comprises a vertical member 310 which is mounted to image pick-up unit 120. Vertical member 310 is also connected to a vertical moving member 330, which is able to move vertically along member 310. A horizontal member 320 is connected to the lower end of vertical member 310, and a horizontal moving member 340 is connected to vertical moving member 330. An object table 350, upon which the object is placed, is connected to horizontal moving member 340.

Referring to FIG. 7, for separably mounting object moving device 300 to image pick-up unit 120, a screw hole 127 and a plurality of insertion holes 128 are formed in image pick-up unit 120. Further, a plurality of protrusions 312 and connecting hole 311, corresponding to insertion holes 128 and screw hole 127 of image pick-up unit 120, are formed on and in vertical member 310. Protrusions 312 of object moving device 300 are placed in insertion holes 128 of image pick-up unit 120, thereby aligning screw hole 127 with connecting hole 311. A connecting element 313 is then placed through connecting hole 311 and connected to screw hole 127. The plurality of protrusions 312 formed in vertical member 310 secure the mounting location of vertical member 310 and prevent the same from shaking during use of the video display system.

Vertical member 310 and horizontal member 320 can be connected by forming protrusions on vertical member 310 which are placed in holes formed in horizontal member 320. Alternatively, members 310 and 320 may be connected by screwing a screw through a hole in horizontal member 320 into a screw hole in a bottom of vertical member 310.

The connection of vertical member 310 and vertical moving member 330 will now be explained. A moving guide unit 314 is formed on vertical member 310, and a moving guide groove 331 is formed on the vertical moving member 330. In this fashion, moving guide groove 331 can slide along moving guide unit 314. The sides of moving guide unit 314 and moving guide groove 331 are preferably formed as having complementary trigonometrical shape, generally used in mechanical devices. Also, a rack 315 is formed on a front face of moving guide unit 314, and a pinion hole 332 is formed on a side face of vertical moving member 330. A pinion member 333 passes through pinion hole 332 to connect with rack 315. A user manipulates pinion member 333 to precisely control the movement of vertical moving member 330. Furthermore, a female screw hole (not shown) is formed on the other side face of vertical moving member 330. and is connected to a male screw (not shown). If the screw is rotated, an end part of the screw is pressed to a side face of moving guide unit 314 to hold the position of vertical moving member 330 securely in place.

The connection of vertical moving member 330 and horizontal moving member 340 will now be described. A connecting groove 334 is formed on a bottom side of vertical moving member 330 and includes a plurality of screw holes. Connecting holes are formed in horizontal moving member 340, and a plurality of screws (not shown) are passed through the connecting holes and screwed in the screw holes of connecting groove 334.

Figure 8:
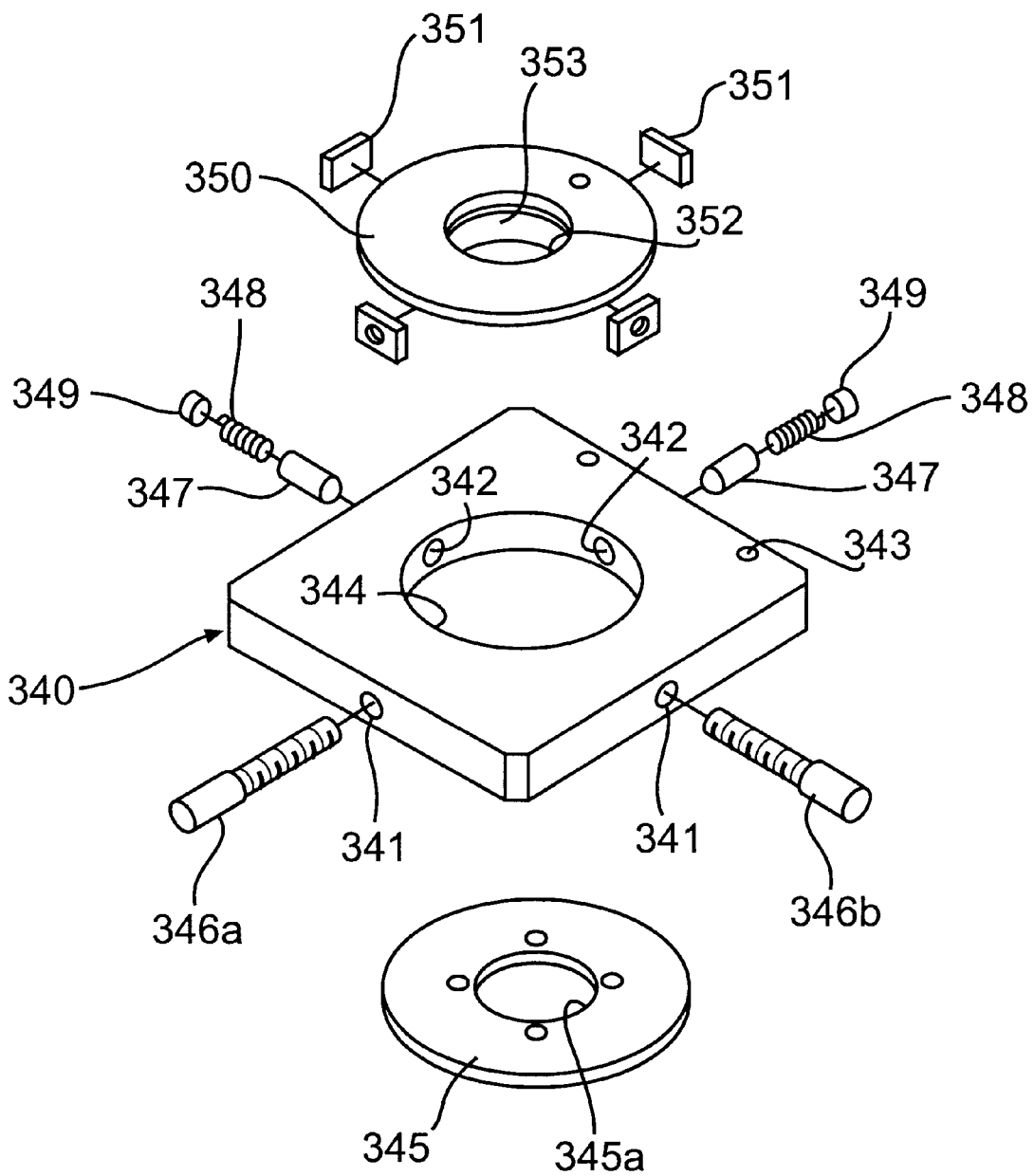
FIG. 8 is an assembly perspective view of a horizontal moving) member 340 and an object table 350 shown in FIG. 7.

FIG. 8 is an assembly perspective view of horizontal moving member 340 and object table 350 shown in FIG. 7. Referring to FIG. 8, the connection of horizontal moving member 340 to object table 350 will now be described. A connecting hole 344 is formed in a center of horizontal moving member 340. Screw holes 341 pass through two sides of horizontal moving member 340 into connecting hole 344. Opposite screw holes 341 are formed spring holes 342. A support plate 345 includes a light passage hole 345a and is attached to the bottom of horizontal moving member 340, such that light passage hole 345*a* is aligned with connecting hole 344. Pressing plates 351 are placed at each screw hole 341 and spring hole 342 in connecting hole 344, such that they are located between object table 350 and horizontal moving member 340.

Object table 350 includes a light passage opening 352 and a cylinder unit 353, each matching the cylindrical proportions of connecting hole 344 to allow for its insertion therein. Inserted in spring holes 342 are pressing rods 347, springs 348, and spring fixing plates 349, such that pressing rods 347 contact pressing plates 351. Also, a left-right moving screw 346*a* and a front-back moving screw 346*b* are inserted into screw holes 341 of horizontal moving member 340 for contact with pressing plates 351. In addition, a glass plate (not shown) is preferably attached to the top of connecting hole 344 of object table 350.

As shown in FIG. 6, a light passage opening 322 is formed in horizontal member 320 at a location below light passage opening 352 of object table 350. In addition, light passage opening 322 preferably has a circumference larger than that of opening 352.

Figure 9:
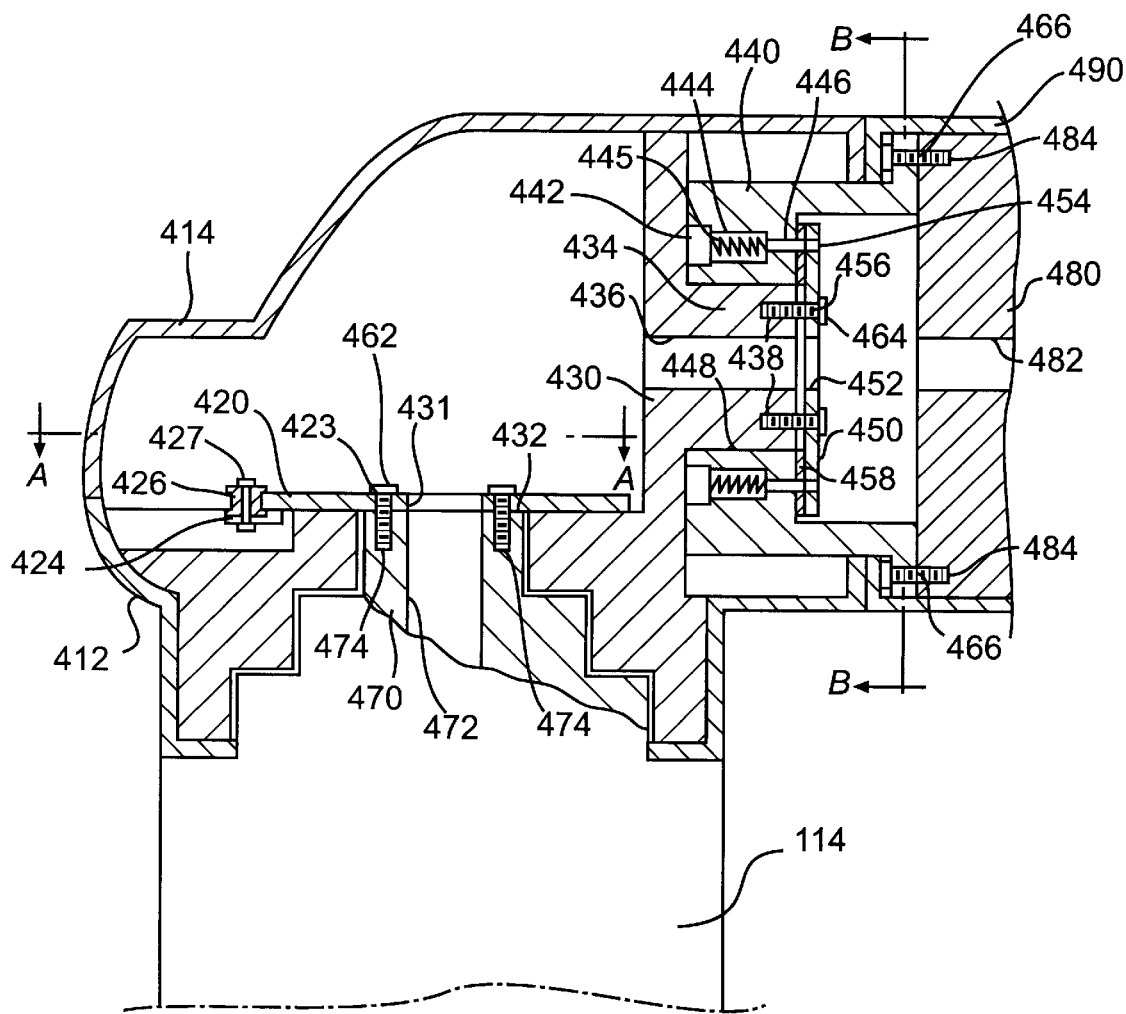
FIG. 9 is a partial sectional view of a main pole rotating device 400 shown in FIG. 1.

FIG. 9 is a partial sectional view of main pole rotating device 400 shown in FIG. 1. Referring to FIG. 9, rotating device 400 comprises a lower rotating cover 412, an upper rotating cover 414, a horizontal rotating portion 415, and a vertical rotating portion 475. Horizontal rotating portion 415 is mounted in an internal space formed by the lower and upper rotating covers 412 and 414. Horizontal rotating portion 415 is connected to and rotates on vertical moving device 114. Vertical rotating portion 475 is mounted in the same internal space as is portion 415, and is connected with image pick-up unit 120 so that it can rotate vertically.

Figure 10:
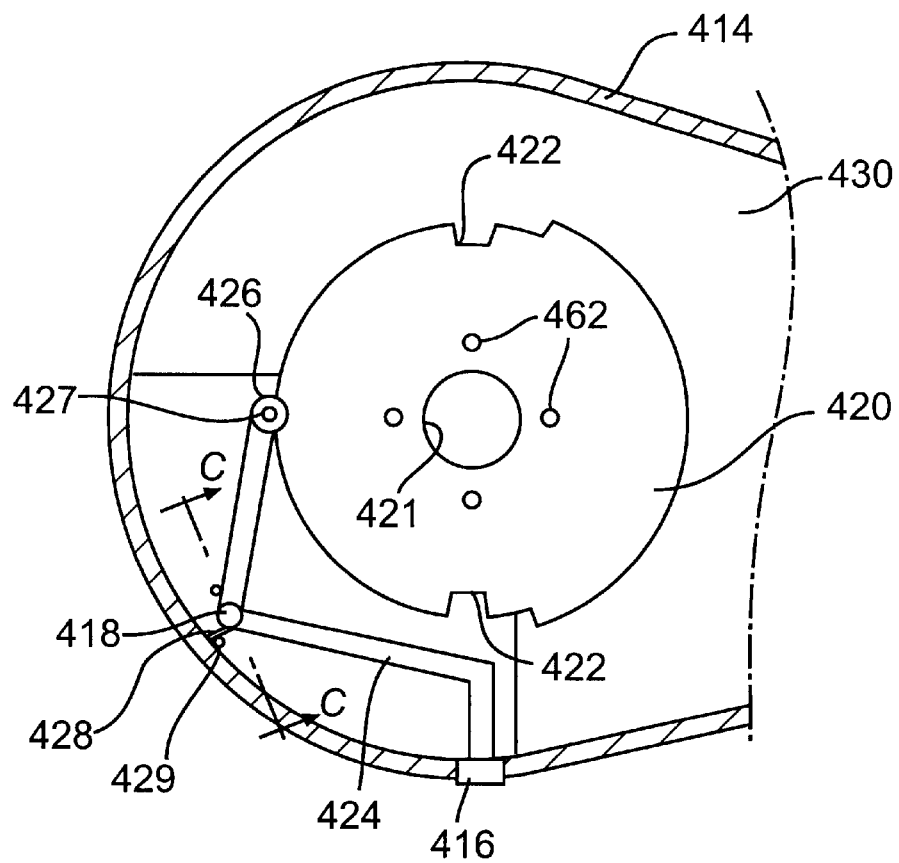
FIG. 10 is a sectional view taken along line X—X of FIG. 9.

FIG. 10 is a sectional view taken along line X—X in FIG. 9. As shown in FIGS. 9 and 10, horizontal rotating portion 415 includes a horizontal rotating body 430, having a support shaft groove 432 formed to its lower portion. A support shaft 470 is formed in an upper part of vertical moving device 114, and is inserted in support shaft groove 432. A horizontal rotating plate 420 is fixed to support shaft 470 and has a plurality of fixing grooves 422 formed on an outside circumference of plate 420. Also included in rotating portion 415 is horizontal fixing means 425, an end of which is inserted in one of the fixing grooves 422 and which controls the rotation of horizontal rotating plate 420. Further, a pressing button 416 is provided that is connected to horizontal fixing means 425.

A preferred method for fixing horizontal rotating plate 420 to support shaft 470 will now be explained. A plurality of screw holes 423 are formed in horizontal rotating plate 420. In addition, a plurality of female screw openings 474 are formed in an upper unit of support shaft 470, each corresponding to screw holes 423. A plurality of small screws 462 are passed through screw holes 423 and screwed into female screw openings 474. However, the present invention is not limited to this structure and it is possible to use other methods for fixing horizontal rotating plate 420 to support shaft 470. For example, support shaft 470 can be inserted in holes formed in horizontal rotating plate 420. Also, a plurality of protrusions formed on an upper face of support shaft 470 can be inserted into corresponding holes formed in horizontal rotating plate 420.

Support shaft 470 of vertical moving device 114 and support shaft groove 432 formed on horizontal rotating body 430, are each formed having a plurality of step-like formations. This step-like structure improves stability when horizontal rotating body 430 is performing a horizontal rotation.

Figure 11:
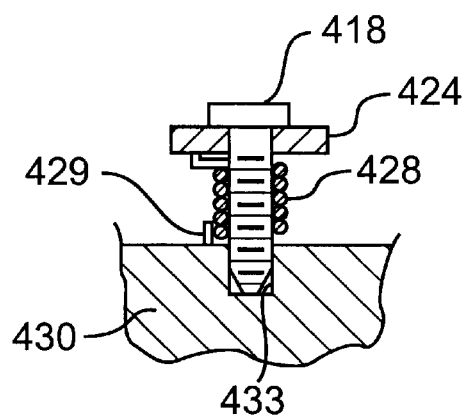
FIG. 11 is a sectional view taken along line XI—XI of FIG. 10.

Referring also to FIG. 11 which is a sectional view along line XI—XI in FIG. 10, horizontal fixing means 425 comprises a fixing rod 424 which has a zig-zag shape. A fixing roller 426 is connected to an end of fixing rod 424 by pin a 427, and a part of which is inserted in one of fixing grooves 422 of horizontal rotating plate 420. A spring fixing pin 418 is fixed to horizontal rotating body 430, such that fixing rod 424 is able to rotate. A return spring 428 is disposed on spring fixing pin 418, and a spring fixing protrusion 429, formed on horizontal rotation body 430, anchors an end part of return spring 428.

With regard to the method of disposing the center unit of fixing rod 424 such that it rotates on horizontal rotating body 430, it is preferable to form a female screw opening 433 in horizontal rotating body 430, having screw threads at the end of spring fixing pin 418. In this fashion, pin 18 can be passed through fixing rod 424 and screwed into female screw opening 433. Further, one end of return spring 428 is elongated and fixed to spring fixing protrusion 429, while the other end is elongated to catch the outside surface of fixing rod 424. Accordingly, rod 424 is pushed toward horizontal rotating plate 420.

It is preferable that fixing roller 426 is formed such that a portion of its width is equal to that of horizontal rotating plate 420 in order to allow it to be securely fixed in the fixing groove 422 of plate 420. Also, it is preferable that pin 427 is rotatably fixed to fixing rod 424 in order to prevent fixing roller 426 from slipping along an outside surface of horizontal rotating plate 420 while image pick-up unit 120 is rotating in the horizontal direction.

Figure 12:
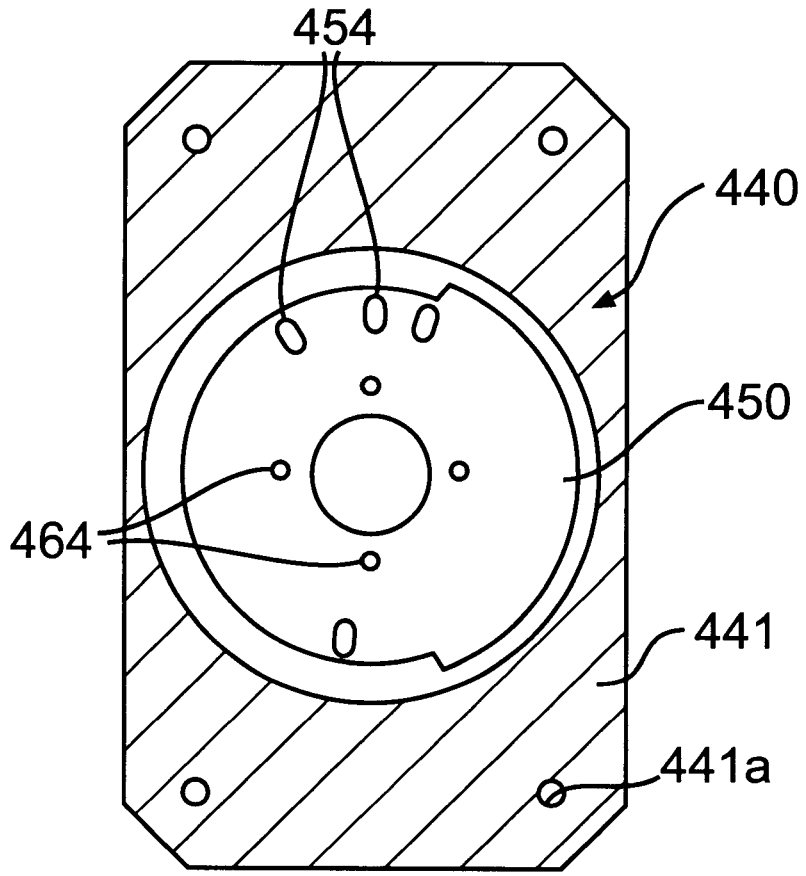
FIG. 12 is a sectional view taken along line XII—XII of FIG. 9.

FIG. 12 is a sectional view taken along line XII—XII of FIG. 9. Vertical rotating portion 475, as shown in FIGS. 9 and 12, includes a vertical rotating body 440 fixed to image pick-up unit 120. A vertical rotating plate 450 is fixed to horizontal rotating body 430 of vertical rotating portion 475 and has a plurality of fixing holes 454. Springs 444 are inserted in spring insertion grooves 445 formed in vertical rotating body 440. Fixing bars 446 are connected to one end of springs 444 and are inserted in fixing holes 454. Spring fixing plates 442 are arranged on vertical rotating body 440 and are fixed on an opposite end of springs 444 to which fixing bars 446 are disposed. Further, a friction spring 458 is inserted between vertical rotating plate 450 and the vertical rotating body 440.

In the above structure, it is preferable to connect vertical rotating body 440 and image pick-up unit 120 by forming a plurality of screw holes 441*a* in a flange unit 441 of the vertical rotating body 440. In addition, female screw grooves 484 are formed opposite screw holes 441*a* on a connecting face of image pick-up unit 120. A plurality of small screws 466 are then screwed, through the screw holes 441*a*, into female screw grooves 484. Flange unit 441 of vertical rotating body 440 is then covered by an image pick-up unit cover 490. In addition, fixing shafts 434, formed in a vertical part of horizontal rotating body 430, are inserted into fixing shaft holes 448 formed in vertical rotating body 440.

Also, it is preferable to fix vertical rotating plate 450 to horizontal rotating body 430 by forming a plurality of female screw grooves 438 on an outer face of fixing shafts 434, and forming a plurality of corresponding screw holes 456 in the horizontal rotating plate 450. Small screws 464 are then screwed into female screw grooves 438 through screw holes 456. It is also preferable to form an end part of fixing bars 446 having a round shape (or to use ball bearings) so that they can easily be removed from fixing holes 454 of vertical rotating plate 450.

Figure 13:
FIG. 13 is a front view of a friction spring 458 shown in FIG. 9.
Figure 14:
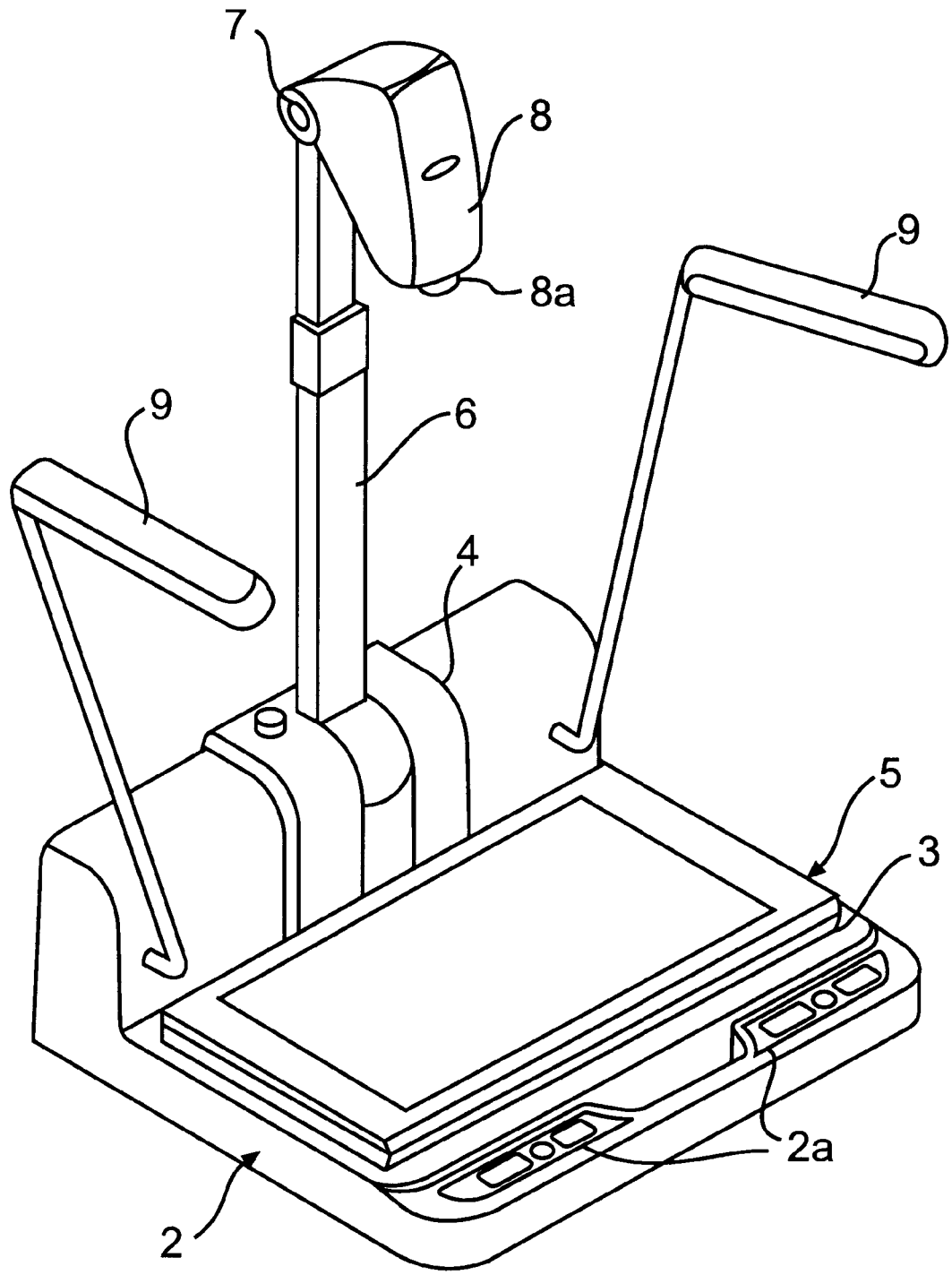
FIG. 14 is a perspective view of a prior art video overhead display system.

Referring to FIG. 13, a friction spring 458 is a plate spring having a plurality of elevations. Friction spring 458 is fixed between one face of vertical rotating plate 450 and an inside face of vertical rotating body 440. By this arrangement, friction spring 458 exerts a predetermined amount of pressure on both of these faces. Further, it is possible to form friction spring 458 in a ring shape, and, to form the ring shape into two equal parts.

Horizontal rotating body 430 rotates while being fixed integrally with lower rotating cover 412 and upper rotating cover 414, and vertical rotating body 440 rotates while being integrally fixed to image pick-up unit 120. Also, wiring holes 472, 482, 431, 436, and 452 are respectively formed on support shaft 470 of vertical moving device 114, image pick-up unit 120, vertical rotating plate 420, horizontal rotating body 430, and vertical rotating plate 450, to allow for wiring to each of the above parts.

The operation of the video overhead display system of the present invention will be now be described. First, an object is placed on object table 102 and an optical image of the object is formed in the image pick-up device mounted in image pick-up unit 120. Pick-up unit 120 converts the optical image into an electronic image signal and outputs the image data to the image reversing device (see FIG. 2). The zoom lens unit is adjusted to a desired magnification of the object, and lighting device 122 is adjusted to illuminate the object.

Depending upon the mode selected for the image reversing device, the image signal is either reversed or left in its upside-down state, and output to display device 10, which converts the signal into a displayed image. At this stage, if an image processor is included with display device 10, then the image data is processed to create a better image, as known to those skilled in the art. Namely, the image data may be synthesized, the colors may be changed, or still images may be selected for use in a moving image.

Further, if cellular tissue or microorganisms are being viewed, image enlarger 200 is provided connected to image pick-up unit 120. In this case, the image of the object is magnified by an initial magnification of object lens unit 220, by a second magnification of eyepiece lens unit 230, and by a tertiary magnification of the zoom lens unit mounted in image pick-up unit 120. The resulting magnified image is magnified to an extremely high degree (e.g., 800 times), and is able to be formed in the image pick-up device mounted in image pick-up unit 120.

The process of converting the optical image signal into the electronic image data, and outputting a reversed image by reversing device 140, will now be described in detail. The image pick-up unit 120 outputs the electronic image signal to A/D converter 130 which outputs digital image data to image reverser 140. If a user selects a reversing mode using control panel 106, then control signal generator 141 outputs a control signal to input line selection unit 142, address select unit 143, memory 145, and output unit 147. Memories 145*a* and 145*b* then store the image data at addresses corresponding to addresses output from first and second address select units 143*a* and 143*b*. These addresses are based upon the count values of column address counter 143*c* and row address counter 143*d*.

A read operation of first and second memories 145a and 145b is realized by reading from the first memory address if a normal mode is selected, and read from the last memory address if a reverse mode is selected. An image is output while read and write operations are performed on memory 145. This is made possible in the present invention by having two memories 145a and 145b, such that when first memory 145a writes image data, second memory 145b reads image data, and vice versa.

The digital image data is then output from memory 145 to output unit 147 of image reverser 140, which outputs the image data to digital signal processor 150. Digital signal processor 150 converts the image data into a brightness signal, a chrominance signal, and a composite synchronous signal. These signals are realized through, for example, a vertical and horizontal synchronous signal, a vertical and horizontal blanking signal, or a color burst signal. These signals are then output to image signal processor 160, which combines the signals and converts them into a composite image signal. The composite image signal is then output from the video overhead display system, according to the present invention, and is reproduced as an image using the image processor display device 10.

If a small object such as cellular tissue or a microorganism is being viewed, image enlarger 200 and object moving device 300 are mounted to image pick-up unit 120. In this case, the object is placed on object table 350 of object moving device 300, and object lens unit 220 and the zoom lens unit of image pick-up unit 120 are adjusted to magnify the object according to a selected magnification. Here, it is possible to magnify the object to a level of 800 times through the use of object lens unit 220, eyepiece lens unit 230 and the zoom lens unit of image pick-up unit 120.

Light source 123 of lighting device 122, located in image pick-up unit 120, provides light to object lens 220. The light irradiated from light source 123 is focused in light transmitting unit 252 by condenser lens 124. The focused light is then transmitted through light transmitting unit 252 and irradiated upon object lens unit 220 through prism 258. Optical fibers are preferably used for light transmitting unit 252 since they allow easy adjustment of the light's irradiation location.

Also, light box 104 mounted on top of object plate 102 emits light through the following openings: light passage opening 322 formed in horizontal member 320, light passage hole 345a formed in support plate 345, and light passage opening 352 of object table 350. After passage through these openings, the light is irradiated on the bottom of the object placed on object table 350. Also, vertical moving member 330 and the horizontal moving member 340 move the object on object table 350 in three different directions, thereby precisely controlling the location of the object.

The vertical movement of object table 350 is realized by rotating pinion member 333, which is connected to rack 315 of vertical member 310. Furthermore, since moving guide unit 314 of vertical member 310 slides with moving (guide groove 33 of vertical moving member 330, the vertical movement of the object plate is smooth. If object table 350 is located at a desired position, the user stops rotating pinion member 333. In addition, the fixing element (not shown) is screwed into a side face of moving guide unit 314 so as to secure the position of vertical moving member 330.

The horizontal movement of object table 350 is realized through the rotation of left-right moving screw 346a and front-back moving screw 346b, each of which are screwed into horizontal moving member 340. Further, the combination of left-right and front-back moving screws 346a and 346b, pressing rods 347, and pressing plates 351, prevent object table 350 from shaking. The diameter of connecting hole 344 formed in horizontal moving member 340 is preferably larger than the outside diameter of cylinder portion 353 of object table 350. This difference in diameter determines the extent to which object table 350 can move in the horizontal direction. Therefore, object table 350 can be precisely adjusted by rotating pinion member 333, left-right moving screw 346a and front-back moving screw 346b.

The optical image of the object is turned upside-down by object lens unit 220. However, image reversing device 140 is able to reverse the image signal inputted from the image pick-up device. A user can select the mode of the image reversing device, such that either the reversed or upside-down image is output. Moreover, because the image can be reversed into a right-side-up state, a user is able to more easily move the object to a precise location by object moving device 300.

The rotating operation of rotating device 400, of support 110 in the video overhead display system of the present invention, will now be described in detail. If the user presses pressing button 416, the fixing rod 424 rotates about spring fixing pin 418. In response, fixing roller 426 becomes separated from fixing groove 422. In addition, horizontal rotating plate 420 and support shaft 470 become separated from horizontal rotating body 430 and lower rotating cover 412. The separation of these elements allows for horizontal rotating portion 415 to rotate.

If horizontal rotating portion 415 is rotated horizontally and pressing button 416 is no longer depressed, the elastic force of return spring 428 pushes fixing roller 426 in the direction toward horizontal rotating plate 420. If the horizontal rotating unit 415 is further rotated, fixing roller 426 comes to be located in the next fixing groove 422 of horizontal rotating plate 420. Accordingly, fixing roller 426 is inserted in fixing groove 422, thereby stopping the rotation. This results in horizontal rotating plate 420 and support shaft 470 becoming re-connected with horizontal rotating body 430 and lower rotating cover 412.

Also, if image pick-up unit 120 is rotated vertically, vertical rotating body 440 rotates and springs 444 are compressed by fixing bars 446, which push against vertical rotating plate 450. If image pick-up unit 120 rotates further, fixing bars 446 become inserted into the next fixing holes 454 of vertical rotating plate 450. Vertical rotating body 440 becomes fixed in image pick-up unit 120, and vertical rotating plate 450 becomes fixed in horizontal rotating body 430.

In the above arrangement, fixing bars 446 are inserted in fixing holes 454 by the elasticity of spring 444. Vertical rotating body 440 then becomes fixed to image pick-up unit 120, and vertical rotating plate 450 becomes fixed to horizontal rotating body 430. In addition, as friction spring 458 is inserted between vertical rotating plate 450 and vertical rotating body 440, a sufficient amount of force must be used to vertically rotate image pick-up unit 120. This prevents image pick-up unit 120 from rotating due to the force of its own weight and allows it to remain securely in place. Furthermore, a variety of horizontal and vertical angles may be selected by forming at fixed intervals a plurality of fixing holes 454 in vertical rotating plate 450 and a plurality of fixing grooves 422 in horizontal rotating plate 420.

The video overhead display system of the present invention, has the advantage in that it allows various image processing operations to be performed on the image of an object being viewed. Also, the present invention does not require an image microscope or lamps separate from image enlarger 200 and image pick-up unit 120, thus making the present invention more portable.

Furthermore, an image is easily reversed into a right-side-up state by a user selecting a reversing mode through control panel 106. This feature allows the object to be easily positioned and for its shape to be easily determined. Furthermore, the interchangeability of object lens unit 220 allows a large variety of differing magnifications to be used. Finally, because image pick-up unit 120 of the present invention can be adjusted to a variety of different angles by rotating device 400 of support 110, an image of the object is easily obtained without moving the object itself.

It will be apparent to those skilled in the art that various modifications and variations can be made in the method and system of the present invention without departing from the spirit or scope of the invention. The present invention covers the modifications and variations of this invention provided they come within the scope of the appended claims and their equivalents.

What is claimed is:

1. A video overhead display system for displaying an image of an object, comprising:

image enlarging means for magnifying an optical image of the object;

image pick-up means for receiving the magnified optical image of the object and converting the magnified optical image into an electronic image signal;

image output means for receiving the electronic image signal and converting the electronic image signal into a displayed image; and image reversing means which selectively reverses the image of the object, wherein the image reversing means further includes, an A/D converter which receives an electronic image signal output from the image pick-up means and converts the electronic image signal into a digital image signal, an image reverser, which receives the digital image signal from the A/D converter, selectively reverses the digital image signal, and outputs the selectively reversed digital image signal, a digital signal processor which processes the digital image signal received from the image reverser, and outputs a luminance signal, a chrominance signal, and a composite synchronizing signal, and an image signal processor which combines the luminance, chrominance, and composite synchronizing signals, and outputs the combined signals as a composite image signal.

2. The system of claim 1, wherein the image pick-up means comprises:

an image pick-up device which converts the optical image into the electronic image signal;

a zoom lens unit, fixed to the image pick-up device, and which magnifies the optical image of the object; and a lighting device which illuminates the object, wherein the image reversing means receives the electronic image signal from the image pick-up device and selectively reverses the received image signal.

3. The system of claim 1, wherein the image enlarging means comprises:

an object lens unit which magnifies the optical image of the object;

an eyepiece lens unit fixed at a predetermined distance from the object lens unit; and a lens barrel having a predetermined length, which is fixed at one end to the object lens unit and which is fixed at the other end to the eyepiece lens unit.

4. A video overhead display system for displaying an image of an object, comprising:

a body having a control panel;

an image enlarger for magnifying an optical image of the object;

an image pick-up unit connected to the body, and which picks up the magnified optical image of the object, and wherein the image enlarger is separably mounted to the image pick-up unit;

an image reversing device which selectively reverses the image of the object, wherein the image reversing device further includes an A/D converter which receives an electronic image signal output from the image pick-up unit and converts the electronic image signal into a digital image signal, an image reverser, which receives the digital image signal from the A/D converter, selectively reverses the digital image signal, and outputs the selectively reversed digital image signal, a digital signal processor which processes the digital image signal received from the image reverser, and outputs a luminance signal, a chrominance signal, and a composite synchronizing signal, and an image signal processor which combines the luminance, chrominance, and composite synchronizing signals, and outputs the combined signals as a composite image signal.

5. The system of claim 4, wherein the image pick-up unit includes:

an image pick-up device which converts the magnified optical image of the object into an electronic image signal;

a zoom lens unit, fixed to the image pick-up device, which magnifies the magnified image received from the image enlarger; and a lighting device which illuminates the object.

6. The system of claim 4, wherein the image reverser comprises:

a control signal generating unit which outputs control signals for performing write and read operations of the digital image signals;

an input line selector unit which, according to control signals received from the control signal generating unit, selects an input line for the digital image signals received from the A/D converter;

an address select unit which, according to control signals received from the control signal generating unit, either outputs an address at which the digital image signal is written or outputs an address signal at which the digital image signal is read;

a memory which, according to control signal received from the control signal generating unit, writes or reads the digital image signal according to the address output from the address select unit; and an output unit which, according to control signal received from the control signal generating unit, outputs the digital image signal from the memory to the digital signal processor.

7. The system of claim 6, wherein:

the memory further comprises a first memory and a second memory; and the address select unit includes a first address select unit corresponding to the first memory, and a second address select unit corresponding to the second memory.

8. The system of claim 7, wherein the address select unit comprises:
   a column address counter which counts the number of column addresses according to control signals received from the control signal generating unit, and outputs a count value to the first address select unit and the second address select unit; and
   a row address counter which counts the number of row addresses, according to control signals received from the control signal generating unit, and outputs a count value to the first and second address select units.

9. The system of claim 4, wherein the image enlarger comprises:
   an object lens unit which magnifies an optical image of the object;
   an eyepiece lens unit fixed a predetermined distance away from the object lens unit;
   and a lens barrel having a predetermined length, which at one end is fixed to the object lens unit and at the other end is fixed to the eyepiece lens unit.

10. The system of claim 9, further comprising:
    a light guide connected to the image enlarger for illuminating the object lens unit.

11. The system of claim 9, wherein:
    the image pick-up unit includes an adapter lens unit, the adapter lens unit including
       a guide projection formed on an outside circumference of the adapter lens unit, formed having a reverse 'L' shape, and
       a connecting groove formed parallel to a vertical part of the guide projection; and
    the image enlarger includes a coupling unit, the coupling unit including
       a guide groove formed on an inside part of the coupling unit such that the guide projection of the adapter lens unit can be inserted in the guide groove, and
       a hook formed above the guide groove and which protrudes inward.

12. The system of claim 10, further comprising:
    a lighting device for illuminating the object; and
    wherein the light guide includes
       a light connecting unit connected to the lighting device,
       a light transmitting unit for transmitting light from the lighting device to the object lens unit, and
       a prism fixed above the object lens unit and at an end of the light transmitting unit.

13. The system of claim 12, wherein the light transmitting unit comprises optical fibers.

14. The system of claim 4, wherein an object moving device is separably mounted to the image pick-up unit.

15. The system of claim 14, wherein the object moving device comprises:
    a vertical member mounted to the image pick-up unit;
    a horizontal member connected to a lower end of the vertical member;
    a vertical moving member connected to the vertical member, and which is able to move vertically along the vertical member;
    a horizontal moving member connected to the vertical moving member; and
    an object table connected to the horizontal moving member for holding the object.

16. The system of claim 4, further comprising a support for supporting the image pick-up unit, the support further comprising:
    an angle rotation device connected to the body;
    a vertical moving device connected to the angle rotation device, having two parts which combine to control the length of the vertical moving device; and
    a rotating device fixed to the vertical moving device, such that the rotating device can rotate horizontally and the image pick-up unit can rotate vertically.

17. The system of claim 16, wherein the rotating device comprises:
    a lower rotating cover;
    an upper rotating cover;
    a horizontal rotating unit mounted in an internal space formed by the lower and upper rotating covers, and rotating on the vertical moving device; and
    a vertical rotating unit mounted in an internal space formed by the lower and upper rotating covers, and connected to the image pick-up unit such that the image pick-up unit can rotate vertically.

18. The system of claim 17, wherein:
    the horizontal rotating unit comprises a horizontal rotating body having a support shaft groove;
    the vertical moving device comprising a support shaft which is inserted in the support shaft groove of the horizontal rotating body;
    a horizontal rotating plate fixed to the support shaft and which has a plurality of fixing grooves formed on an outside circumference of the horizontal rotating plate;
    horizontal fixing means for controlling the rotation of the horizontal rotating plate.

19. The system of claim 18, wherein the horizontal fixing means comprises:
    a fixing rod formed in a zig-zag shape;
    a fixing roller connected to an end of the fixing rod and inserted in one of the fixing grooves of the horizontal rotation plate;
    a spring fixing pin connected to the horizontal rotating body such that the fixing rod is able to rotate about the spring fixing pin; and
    a return spring disposed on the spring fixing pin.

20. The system of claim 18, wherein the vertical rotating unit comprises:
    a vertical rotating body fixed to the image pick-up unit and including a plurality of spring fixing grooves;
    a vertical rotating plate fixed to the horizontal rotating body of the vertical rotating unit and which forms a plurality of fixing holes;
    a plurality of springs for insertion into corresponding spring fixing grooves; and
    fixing bars connected to one end of the springs and inserted in the corresponding fixing holes.

21. The system of claim 20, wherein an end portion of the fixing bars are rounded.

22. The system of claim 20, wherein the fixing bars comprise ball bearings.

23. The system of claim 20, wherein a friction spring is fixed between the vertical rotating plate and the horizontal rotating plate.

24. The system of claim 23, wherein the friction spring is formed of a ring-shaped plate spring having a plurality of elevations.

* * * * *